United States Patent
Son et al.

(10) Patent No.: US 9,444,283 B2
(45) Date of Patent: Sep. 13, 2016

(54) METHOD AND APPARATUS FOR WIRELESSLY CHARGING MULTIPLE WIRELESS POWER RECEIVERS

(71) Applicant: Samsung Electronics Co., Ltd., Gyeonggi-do (KR)

(72) Inventors: Jae-Seung Son, Gyeonggi-do (KR); Hee-Won Jung, Gyeonggi-do (KR); Noh-Gyoung Kang, Seoul (KR); Tae-Han Bae, Seoul (KR); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 13/781,013

(22) Filed: Feb. 28, 2013

(65) Prior Publication Data

US 2013/0221915 A1 Aug. 29, 2013

(30) Foreign Application Priority Data

Feb. 28, 2012 (KR) ........................ 10-2012-0020141

(51) Int. Cl.
| | | |
|---|---|---|
| *H02J 7/02* | (2016.01) | |
| *H02J 7/00* | (2006.01) | |
| *H02J 1/14* | (2006.01) | |
| *H02J 5/00* | (2016.01) | |
| *H02J 17/00* | (2006.01) | |
| *H04B 5/00* | (2006.01) | |

(52) U.S. Cl.
CPC ............... *H02J 7/025* (2013.01); *H02J 1/14* (2013.01); *H02J 5/005* (2013.01); *H02J 7/0042* (2013.01); *H02J 17/00* (2013.01); *H04B 5/0037* (2013.01); *H02J 7/0022* (2013.01)

(58) Field of Classification Search
None
See application file for complete search history.

(56) References Cited

U.S. PATENT DOCUMENTS

| | | | | |
|---|---|---|---|---|
| 8,373,386 | B2* | 2/2013 | Baarman ................. | H02J 5/005 320/104 |
| 2005/0200332 | A1* | 9/2005 | Kangas ................. | H02J 7/0073 320/128 |
| 2007/0069693 | A1 | 3/2007 | Patino et al. | |
| 2007/0139000 | A1 | 6/2007 | Kozuma et al. | |
| 2010/0188041 | A1* | 7/2010 | Mizuo ..................... | H02J 7/025 320/108 |
| 2011/0140653 | A1* | 6/2011 | Jung et al. ..................... | 320/108 |

(Continued)

FOREIGN PATENT DOCUMENTS

| | | |
|---|---|---|
| KR | 10-0818468 | 4/2008 |
| KR | 10-1114428 | 2/2012 |
| WO | WO 2012/003404 | 1/2012 |

OTHER PUBLICATIONS

European Search Report dated Oct. 1, 2015 issued in counterpart application No. 13754734.5-1804, 8 pages.

*Primary Examiner* — Edward Tso
*Assistant Examiner* — Dung V Bui
(74) *Attorney, Agent, or Firm* — The Farrell Law Firm, P.C.

(57) ABSTRACT

A method and apparatus are provided for transmitting wireless power to at least one wireless power receiver. The apparatus includes a communication unit that receives power management information from the at least one wireless power receiver, wherein the power management information includes a power capacity of each of the at least one wireless power receiver; and a controller that analyzes the power management information and determines whether an output capacity of the wireless power transmitter is greater than a total sum of the power capacities of the at least one wireless power receiver.

18 Claims, 5 Drawing Sheets

(56) References Cited

U.S. PATENT DOCUMENTS

| | | | |
|---|---|---|---|
| 2011/0234156 A1* | 9/2011 | Fujita | H02J 7/0027 320/108 |
| 2011/0260532 A1 | 10/2011 | Tanabe | |
| 2011/0260681 A1 | 10/2011 | Guccione et al. | |
| 2012/0091951 A1* | 4/2012 | Sohn | H02J 7/0047 320/108 |
| 2012/0112539 A1* | 5/2012 | Yamamoto | H02J 7/0021 307/11 |
| 2013/0221915 A1* | 8/2013 | Son | H02J 7/025 320/108 |

* cited by examiner

US 9,444,283 B2

1

METHOD AND APPARATUS FOR WIRELESSLY CHARGING MULTIPLE WIRELESS POWER RECEIVERS

PRIORITY

This application claims priority under 35 U.S.C. §119(a) to Korean Patent Application Ser. No. 10-2012-0020141, which was filed in the Korean Intellectual Property Office on Feb. 28, 2012, the entire disclosure of which is incorporated herein by reference.

BACKGROUND OF THE INVENTION

1. Field of the Invention

The present invention relates generally to a method and apparatus for wirelessly charging multiple wireless power receivers, and more particularly, to a method and apparatus for wirelessly charging multiple wireless power receivers using a single wireless power transmitter.

2. Description of the Related Art

Wireless charging technology uses wireless power transmission and reception to, for example, charge a battery of a cell phone by placing the cell phone on a charging pad without using a separate physical charging connector, e.g., a charging cable.

The wireless charging technologies include an electromagnetic induction method using coils, a resonance method using resonance, and a Radio Frequency (RF)/micro wave radiation method that converts electrical energy into microwaves for transmission.

However, systems using these conventional wireless charging technologies have a problem that if a total sum of capacities of wireless power receivers to be charged exceeds an output capacity of a wireless power transmitter, the wireless power receivers cannot receive the wireless power. Thus, if there are multiple wireless power receivers to be wirelessly charged at the same time, transmission/reception of the wireless power often cannot be performed in the conventional wireless power transmission systems.

SUMMARY OF THE INVENTION

Accordingly, the present invention is designed to address at least the problems and/or disadvantages described above and to provide at least the advantages described below.

An aspect of the present invention is to provide a wireless power transmitter that supplies wireless power when a total capacity of wireless power receivers to be wirelessly charged exceeds the power of the wireless power transmitter.

In accordance with an aspect of the present invention, a wireless power transmitter for transmitting wireless power to at least one wireless power receiver is provided, the wireless power transmitter including a communication unit for receiving power management information from each of the at least one wireless power receiver, the power management information including a power capacity of each of the at least one wireless power receiver; and a controller for analyzing the power management information and determining whether an output capacity of the wireless power transmitter is greater than a total sum of power capacities of the at least one wireless power receiver.

In accordance with another aspect of the present invention, a method of controlling a wireless power transmitter for transmitting wireless power to at least one wireless power receiver is provided, the method including: receiving power management information from each of the at least one wireless power receiver, the power management information including a power capacity of each of the at least one wireless power receiver; and analyzing the power management information and determining whether an output capacity of the wireless power transmitter is greater than a total sum of power capacities of the at least one wireless power receiver.

BRIEF DESCRIPTION OF THE DRAWINGS

The above and other aspects, features, and advantages of certain embodiments of the present invention will become more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
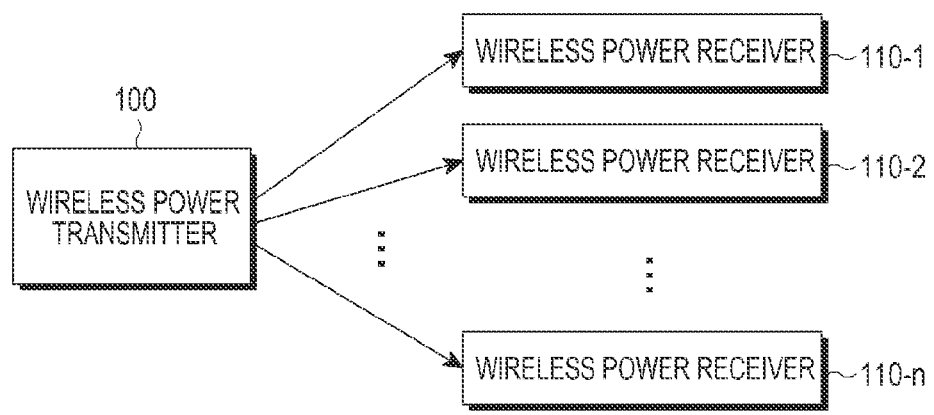
FIG. 1 illustrates a wireless power transmission/reception system, according to an embodiment of the present invention.

FIG. 1 illustrates a wireless power transmission/reception system, according to an embodiment of the present invention.

Referring to FIG. 1, the wireless power transmission/reception system includes a wireless power transmitter 100 and wireless power receivers 110-1, 110-2, to 110-n. The wireless power transmitter 100 supplies wireless power using electromagnetic waves to the wireless power receivers 110-1, 110-2, to 110-n.

Additionally, the wireless power transmitter 100 conducts bidirectional communication with the wireless power receivers 110-1, 110-2, to 110-n. The wireless power transmitter 100 and the wireless power receivers 110-1, 110-2, to 110-n process, transmit, and receive communication packets. For example, the wireless power receivers 110-1, 110-2, to 110-n may be cell phones, Personal Digital Assistants (PDAs), Portable Multimedia Players (PMPs), smartphones, etc.

As indicated above, the wireless power transmitter 100 provides wireless power to the plurality of the wireless power receivers 110-1, 110-2, to 110-n. For example, the wireless power transmitter 100 transmits wireless power to the plurality of the wireless power receivers 110-1, 110-2, to 110-n based on a resonance method. When the resonance method is adopted by the wireless power transmitter 100, distances between the wireless power transmitter 100 and the plurality of the wireless power receivers 110-1, 110-2, to 110-n may be 30 meters or less. However, when an electromagnetic induction method is adopted by the wireless power transmitter 100, the distances between the wireless power transmitter 100 and the plurality of the wireless power receivers 110-1, 110-2, to 110-n may be 10 cm or less.

The wireless power receivers 110-1, 110-2, to 110-n may each charge a battery therein by receiving wireless power from the wireless power transmitter 100. The wireless power receivers 110-1, 110-2, to 110-n may also transmit, to the wireless power transmitter 100, a signal requesting wireless power transmission, information necessary for the wireless power reception, state information of the wireless power receiver, and/or control information of the wireless power transmitter, which will be described below in more detail.

Further, the wireless power receivers 110-1, 110-2, to 110-n may provide location information messages to the wireless power transmitter 100, e.g., using RF signals or using short range communication, such as Bluetooth®.

The wireless power receivers 110-1, 110-2, to 110-n may also transmit messages indicating respective charging states to the wireless power transmitter 100.

Additionally, the wireless power transmitter 100 may include a display, for displaying respective states of the wireless power receivers 110-1, 110-2, to 110-n, based on the respective messages received from the wireless power receivers 110-1, 110-2, to 110-n. The wireless power transmitter 100 may also display an estimate of a time remaining until the charging of the respective wireless power receivers 110-1, 110-2, to 110-n is completed.

The wireless power transmitter 100 may also transmit control signals to the wireless power receivers 110-1, 110-2, to 110-n to disable the wireless charging function of the wireless power receivers 110-1, 110-2, to 110-n. For example, when receiving a disable control signal from the wireless power transmitter 100, a wireless power receiver disables its own wireless charging function.

Figure 2:
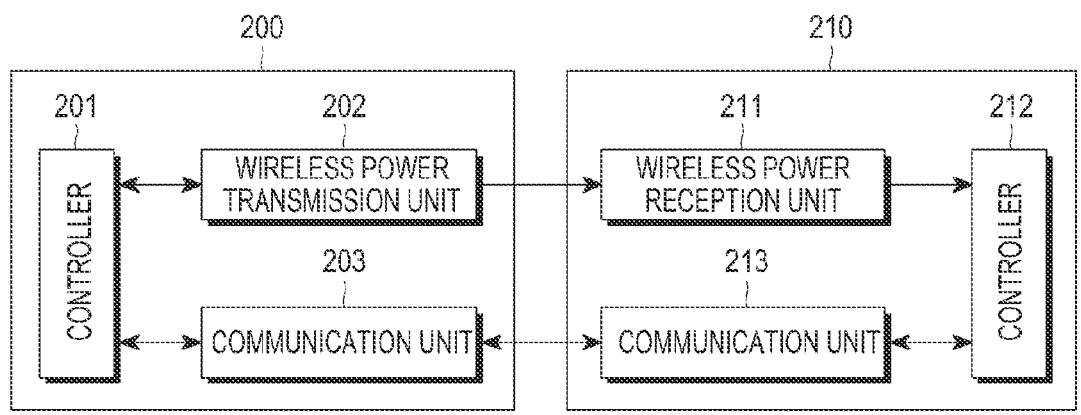
FIG. 2 is a block diagram illustrating a wireless power transmission/reception system, according to an embodiment of the present invention.

FIG. 2 is a block diagram illustrating a wireless power transmission/reception system, according to an embodiment of the present invention.

Referring to FIG. 2, the wireless power transmission/reception system includes a wireless power transmitter 200 and a wireless power receiver 210. The wireless power transmitter 200 includes a controller 201, a wireless power transmission unit 202, and a communication unit 203. Herein, the term "unit" refers to a hardware device or a combination of a hardware device and software.

The controller 201 controls general operations of the wireless power transmitter 200, e.g., using a control algorithm, a program, or an application read from a memory (not shown). The controller 201 may be implemented as a Central Processing Unit (CPU), a microprocessor, or a mini-computer.

The wireless power transmission unit 202 provides power to the wireless power receiver 210, wirelessly. For example, the wireless power transmission unit 202 may supply power in an Alternate Current (AC) waveform, or may convert power supplied in a Direct Current (DC) form into the AC waveform for supply, by using an inverter. The wireless power transmission unit 202 may also be implemented in as a built-in battery or as a power receiving interface for receiving power from an outside power source and supplying the power to other components in the wireless power transmitter 200. A person having ordinary skill in the art will readily understand that the wireless power transmission unit 202 is not limited thereto, but may be implemented by another device that provides power in an AC waveform.

In addition, the wireless power transmission unit 202 may provide the AC waveform as electromagnetic waves to the wireless power receiver 210. The wireless power transmission unit 202 may further additionally include a loop coil to transmit or receive the electromagnetic waves. When the wireless power transmission unit 202 is implemented with the loop coil, an inductance L of the loop coil may be variable. A person having ordinary skill in the art will readily understand that the wireless power transmission unit 202 is not limited thereto, but may also be implemented as another device that transmits or receives electromagnetic waves.

The communication unit 203 communicates with the wireless power receiver 210, e.g., based on Near Field Communication (NFC), Zigbee communication, infrared communication, ultraviolet communication, etc.

The communication unit 203 receives power management information from the wireless power receiver 210. For example, the power management information includes at least one of a capacity of the wireless power receiver 210, remaining battery power, charging count, battery consumption, battery capacity, and remaining battery power/capacity ratio.

The communication unit 203 may also transmit a charging function control signal to control a charging function of the wireless power receiver 210. The charging function control signal enables or disables the charging function by controlling a wireless power reception unit 211 of the wireless power receiver 210.

The controller 201 may analyze the power management information input from the communication unit 203 and generate the charging function control signal to control the charging function of the wireless power receiver 210.

As described above, when a power output capacity of the wireless power transmission unit 202 is less than a total sum of power capacities of a plurality of wireless power receivers including the wireless power receiver 210, not all of the wireless power receivers may be supplied with the wireless power. Thus, the controller 201 analyzes the power management information received from the plurality of power receivers and determines whether the total sum of the power capacities (also referred to as a "total power capacity") of the plurality of wireless power receivers exceeds the power output capacity of the wireless power transmission unit 202.

If it is determined that the power output capacity of the wireless power transmission unit 202 is greater than the total capacity of the plurality of the wireless power receivers, the wireless power transmission unit 202 transmits the charging function control signal to enable the charging function of all of the wireless power receivers, because the wireless power transmitter 200 has enough power for the plurality of wireless power receivers.

However, if it is determined that the power output capacity from the wireless power transmission unit 202 is less than the total capacity of the plurality of the wireless power receivers, the controller 201 may determine some of the wireless power receivers that will receive wireless power. For example, the controller 201 divides the plurality of wireless power receivers into wireless power receivers that will receive the wireless power and wireless power receivers that will not receive the wireless power.

Further, the controller 201 controls the communication unit 203 to transmit charging function control signals to the wireless power receivers that will receive the wireless power, to turn on their charging functions, while transmitting charging function control signals to the other wireless power receivers, which will not to receive the wireless power, to disable their charging functions. Accordingly, only the wireless power receivers that receive the charging function control signals to turn on their charging functions will receive the wireless power. With the selective power transmission, the wireless power receivers to receive the wireless power may all receive the wireless power because the power output capacity output of the wireless power transmission unit 202 is sufficient for, i.e., is greater than the total power capacity of, these wireless power receivers.

The wireless power reception unit 211 receives wireless power from the wireless power transmission unit 202 under control of a controller 212. For example, the wireless power reception unit 211 may be implemented with a loop coil. The wireless power reception unit 211 receives wireless power from the wireless power transmission unit 202 when the controller 212 turns on the charging function. However, when the controller disables (turns off) the charging function, the wireless power reception unit 211 does not receive wireless power from the wireless power transmission unit 202.

The controller 212 analyzes the charging function control signals received through the communication unit 213 and determines whether to turn on or turn off the charging function.

The controller 212 may also detect a current power related a state of the wireless power receiver 210 and generate the power management information. For example, the power management information may include at least one of a capacity, remaining battery power, charging count, battery consumption, battery capacity, and a remaining battery power/capacity ratio of the wireless power receiver 210. The power management information may also be in a format of message, packet, or frame having a basic structure with a header and a payload. The power management information may additionally include an IDentification (ID) packet, a settings packet, an error packet, a signal intensity packet, an end power reception packet, etc.

The control management information may include at least one of control information of an application voltage of the wireless power transmitter 200, and control information of a frequency and duty cycle of the power transmission signal.

The controller 212 controls the communication unit 213 to transmit the power management information to the wireless power transmitter 200. The controller 212 may encode the power management information and perform first sub-carrier modulation on encoded transmission data. The communication unit 213 may generate a final transmission signal by performing load modulation, i.e., a second modulation, on the first modulated or sub-carrier modulated power management information. The sub-carrier modulation, i.e., the first modulation, may be performed at relatively low frequencies, e.g., on a kHz band, and the load modulation, i.e., the second modulation, may be performed at relatively high frequencies, e.g., on a MHz band. Such a band unit may be just exemplary and the first and second modulation sequence may also be changed.

The charging function control signal and the power management information may be provided in the same data frame. Table 1 below is an example of the data frame.

TABLE 1

| | bit 0 | bit 1 | bit 2 | bit 3 | bit 4 | bit 5 | bit 6 | bit 7 |
|---|---|---|---|---|---|---|---|---|
| byte 0 | frame type (interactive) | | | | short ID | | | Priority |
| byte 1 | | | | Sequence number | | | | |
| byte 2 | Interactive Type (Request Join) | | | ID size type | | ID size type | | |
| byte 3 | | | | Load characteristic | | | | |
| variable | | | | ID(4 byte/8 byte/12 byte) | | | | |
| variable | | | | check sum | | | | |
| variable | | | | | | | | |
| variable | | | | Battery left information | | | | |
| variable | | | | Charging count information | | | | |
| variable | | | | Consumption information | | | | |
| variable | | | | Battery capacity information | | | | |
| variable | | | | Battery left/capacity information | | | | |

In the data frame of Table 1, the 'frame type' field includes a message indicating when the wireless power receiver 210 has entered in a wireless power charging range, and the 'Short ID' field includes an identifier of the wireless power receiver 210 assigned by the wireless power transmitter 200. The identifier is assigned only to receivers near the wireless power transmitter, similar to a Personal Area Network (PAN) ID of a short range communication.

The 'Priority' field includes a message that charges the wireless power receiver 210 preferentially, the 'Sequence number' field includes frame sequence information, and the 'Interactive type' field includes a message indicating power on/power off of the charging function for a charging function control signal. Further, the interactive type field may include a charging request message for the power management information.

The 'ID size type' field includes information regarding the ID length, the 'Load characteristic' field includes information relating to a respective capacity of the wireless power receiver 210, and the 'ID' field includes an identifier of the wireless power receiver 210.

The 'battery left information' field includes the current remaining battery power information of the wireless power receiver 210.

The 'charging count information. field includes information about how many times the wireless power receiver 210 has been charged over a predetermined period.

The 'consumption information' field includes information relating to battery consumption amount of the wireless power receiver 210, the 'battery capacity information' field includes information about the battery capacity of the wireless power receiver 210, and the 'battery left/capacity information' field includes information about a ratio of the remaining battery power to a total battery capacity of the wireless power receiver 210.

As described above, the wireless power transmitter 200 compares a total sum of power capacities of wireless power receivers, including the wireless power receiver 210, with a power output capacity from the wireless power transmission unit 202, and determines which of the wireless power receivers is to receive the wireless power. In this regard, the wireless power transmitter 200 allows some of wireless power receivers to be charged, when the total sum of power capacities of wireless power receivers exceeds the power output capacity from the wireless power transmission unit 202.

Accordingly, the wireless power transmission/reception system illustrated in FIG. 2 advantageously controls a wireless power transmission sequence, based on different pieces of power management information received from the wireless power receiver.

Figure 3:
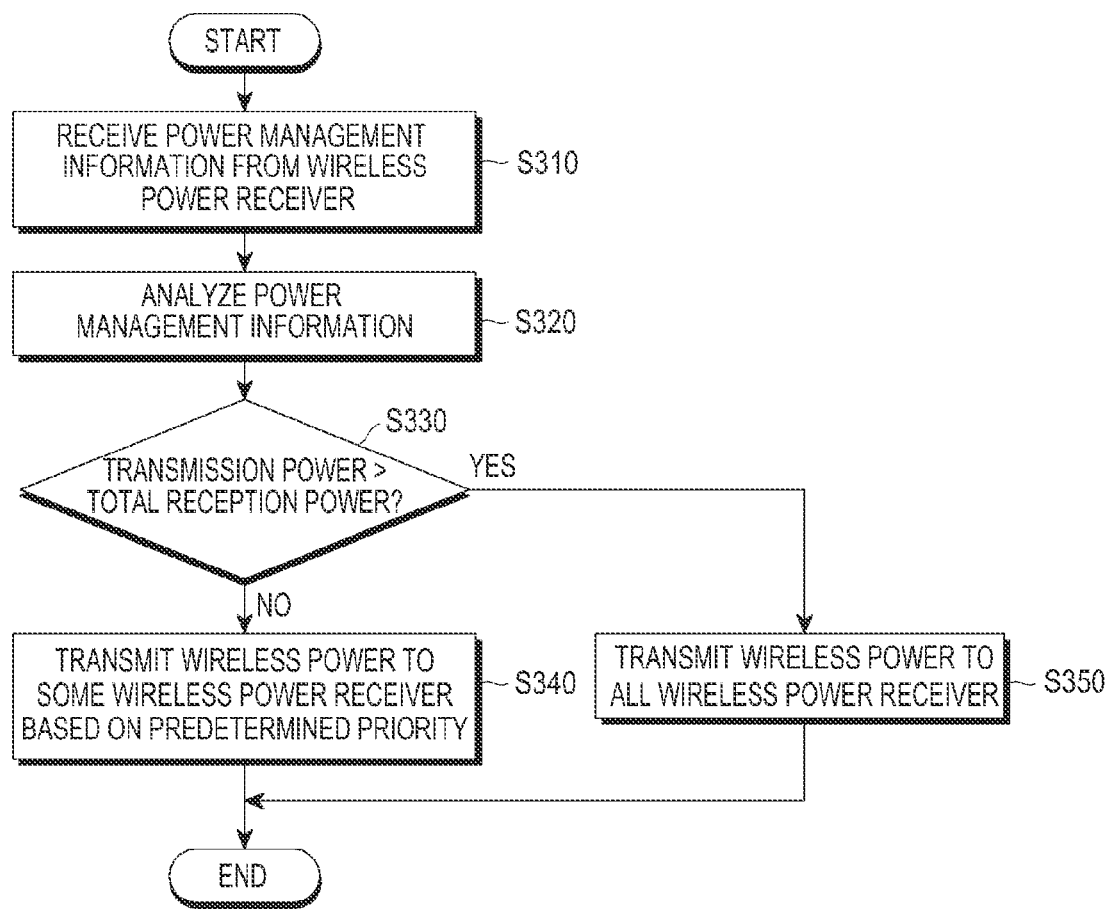
FIG. 3 is a flowchart illustrating a method of controlling a wireless power transmitter, according to an embodiment of the present invention.

FIG. 3 is a flowchart illustrating a method of controlling a wireless power transmitter, according to an embodiment of the present invention.

Referring to FIG. 3, in step S310, the wireless power transmitter receives power management information from a plurality of wireless power receivers. As described above, the power management information may include respective power capacities and charging state information of the plurality of wireless power receivers.

In step S320, the wireless power transmitter analyzes the power management information. For example, the wireless power transmitter determines the respective power capacities of the wireless power receivers from the analysis.

In step S330, the wireless power transmitter combines the respective power capacities of the wireless power receivers and determines whether the total sum of the power capacities exceeds the power capacity (also referred to as an "output capacity") of the wireless power transmitter.

When the total sum of the power capacities of the wireless power receivers is less than the output capacity of the wireless power transmitter in step S330, the wireless power transmitter transmits the wireless power to all of the power receivers in step S350. More specifically, the wireless power transmitter transmits charging function control signals to turn on the charging functions of all of the wireless power receivers.

However, when the total sum of the power capacities of the wireless power receivers is greater than the output capacity of the wireless power transmitter in step S330, the wireless power transmitter transmits the wireless power to some of the wireless power receivers in step S340. For example, the wireless power receivers to receive the wireless power may be determined based on a predetermined order.

More specifically, the wireless power transmitter analyzes different information included in the power management information, determines the wireless power receivers to receive the wireless power, and transmits wireless power charging function control signals to turn on the charging functions of the wireless power receivers that will receive the wireless power and to turn off the wireless power receivers that will not receive the wireless power.

Figure 4:
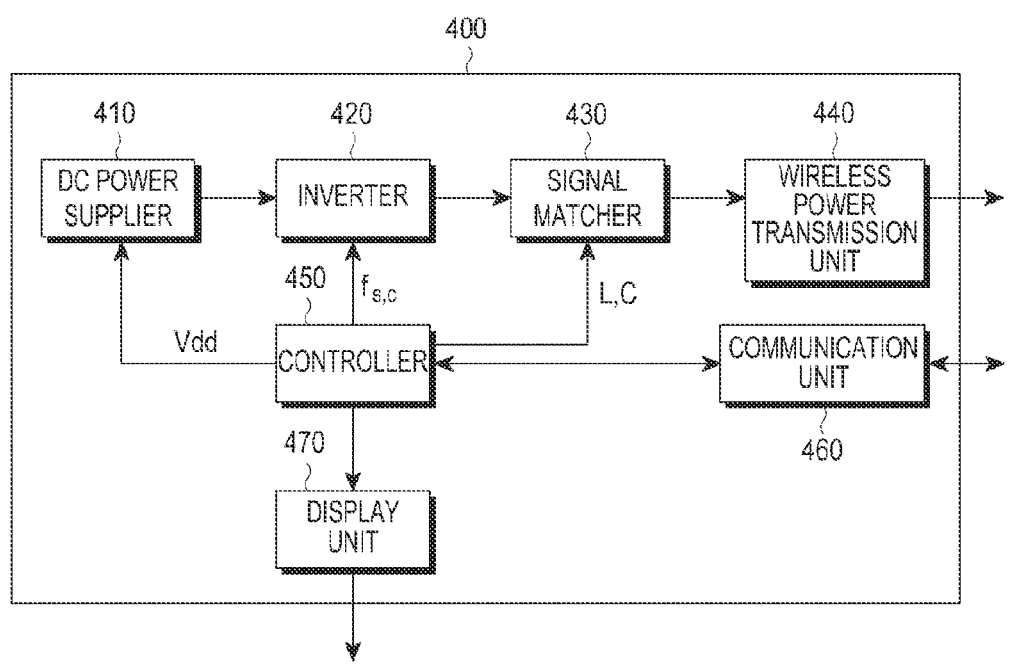
FIG. 4 is a block diagram illustrating a wireless power transmitter, according to an embodiment of the present invention.

FIG. 4 is a block diagram illustrating a wireless power transmitter, according to an embodiment of the present invention.

Referring to FIG. 4, the wireless power transmitter includes a DC power supplier 410, an inverter 420, a signal matcher 430, a wireless power transmission unit 440, a controller 450, a communication unit 460, and a display unit 470.

The DC power supplier 410 provides transmission power to the wireless power receiver in a DC form. For example, the DC supplier 410 may be implemented as a battery, or may be configured to provide DC power from received AC power, after a conversion process. A voltage applied to the DC power supplier 410 may vary under a control of the controller 450.

The inverter 420 inverts DC power input from the DC power supplier 410 to AC waveforms. For example, the inverter 420 may have a power frequency fs or duty cycle τ, which may vary under control of the controller 450.

The signal matcher 430 performs impedance matching on the AC power output from the inverter 420 with the wireless power transmission unit 440.

The wireless power transmission unit 440 supplies the wireless power receiver with the impedance matched AC power in an electromagnetic waveform.

The communication unit 460 receives, from at least one wireless power receiver, respective power management information of the at least one wireless power receiver or control information of the wireless power transmitter 400. The communication unit 460 transmits a ping signal to drive the wireless power receiver periodically or non-periodically.

The controller 450 divides the wireless power receivers into wireless power receivers that will receive the wireless power and wireless power receivers that will not receive the wireless power. This division operation of the controller 450 will be described in more detail below.

The controller 450 generates a charging function control signal to turn on the charging function of a wireless power receiver that will receive the wireless power. The controller 450 also generates a charging function control signal to turn off a charging function of a wireless power receiver that will not receive the wireless power.

In addition to the power management information, the controller 450 may receive at least one of ID information of the wireless power receiver, power reception related information of the wireless power receiver, location information of the wireless power receiver, settings information, safety related information, and control information for the wireless power transmitter. The control information for the wireless power transmitter may include at least one of control information of an application voltage of the wireless power transmitter, and control information of frequency and duty cycle of the power transmission signal.

The controller 450 may obtain from, e.g., power communication data, information that the respective wireless power receivers have not been sufficiently powered, and accordingly, increase the amount of wireless transmission power. The controller 450 may directly increase a voltage Vdd applied to the DC power supplier 410. The controller 450 may also increase the wireless power by adjusting the power frequency fs or duty cycle τ of the inverter 420. Alternatively, the controller 450 may increase the wireless power by adjusting an inductance L or capacitance C of the signal matcher 430.

Further, the controller 450 may perform second demodulation to mix first demodulated charging function control signals with respective corresponding sub-carrier signals. More specifically, the controller 450 may include a frequency synthesizer for oscillating a corresponding sub-carrier signal and a mixer for mixing the corresponding sub-carrier with the first demodulated power communication signal. The charging function control signal includes information about sub-carrier signal frequency, and the controller 450 may analyze the respective power communication signal, controls the oscillation of the corresponding sub-carrier signal, and mixes it with the respective power communication signal.

The controller may also include a decoder for decoding at least a piece of the power management information. The decoder may decode the at least a piece of the power management information demodulated according to any of Non-Return-to-Zero (NRZ), Return-to-Zero (RZ), Manchester code, or bi-phase encoding schemes. For example, the decoder may analyze the power management information, after decoding the power management information according to the bi-phase encoding scheme.

The display unit 470 outputs input graphic data. For example, the display unit 470 may include a Liquid Crystal Display (LCD), a Light Emitting Diode (LED) array, etc. Further, the display unit 470 displays the wireless power receivers that are to receive the wireless power and the wireless power receivers that are not to receive the wireless power. The display unit 470 may also display respective identifiers and corresponding charging states of the wireless power receivers.

Figure 5:
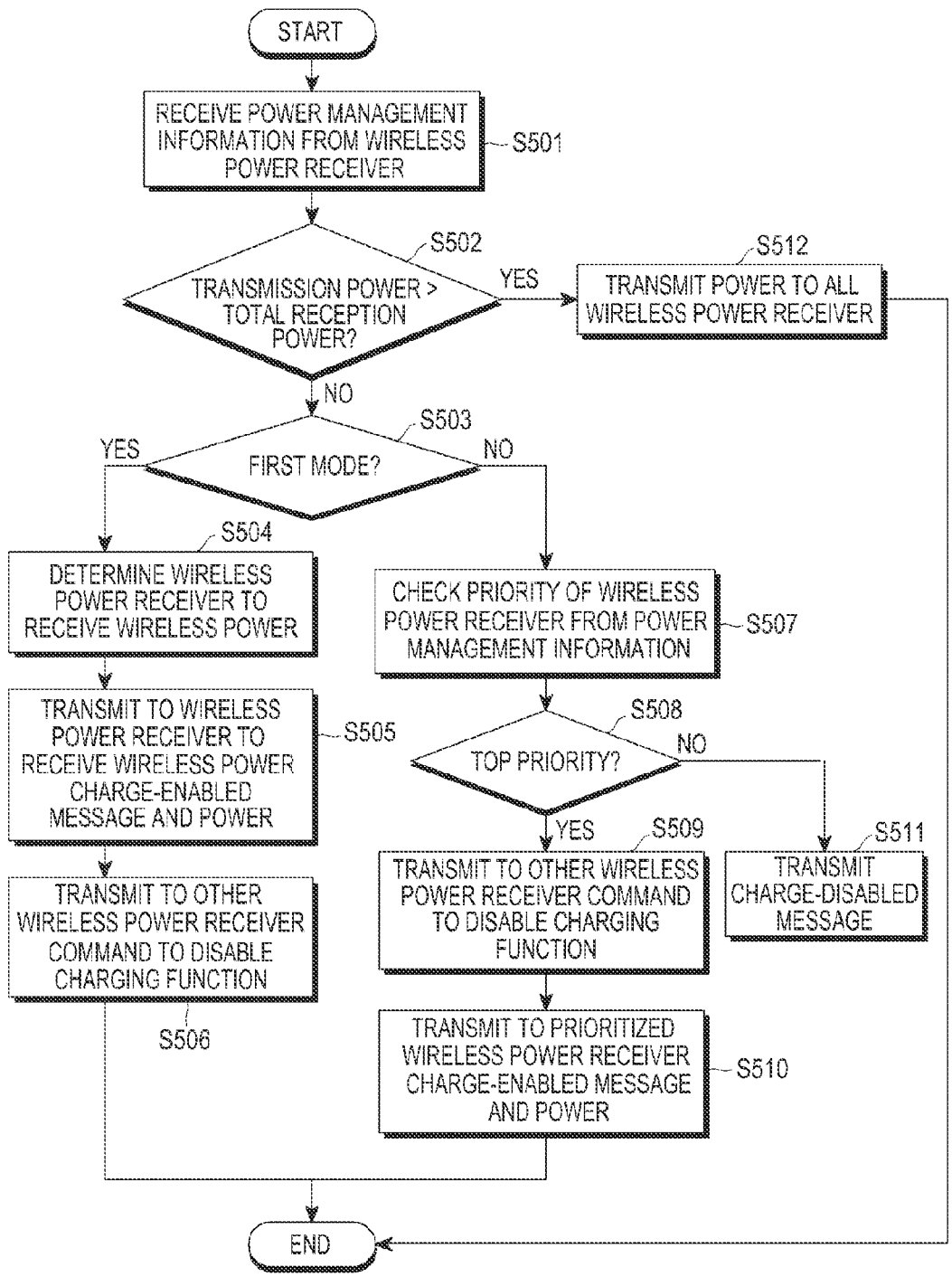
FIG. 5 is a flowchart illustrating a method of controlling a wireless power transmitter, according to an embodiment of the present invention.

FIG. 5 is a flowchart illustrating a method of controlling a wireless power transmitter, according to an embodiment of the present invention.

Referring to FIG. 5, the wireless power transmitter receives the power management information from a wireless power receiver in step S501. In step S502, the wireless power transmitter determines whether the output capacity of the wireless power transmitter is greater than a total sum of power capacities of all wireless power receivers requesting wireless power from the wireless power transmitter.

When the total sum of power capacities of the wireless power receivers is greater than the output capacity of the wireless power transmitter in step S502, the wireless power transmitter determines whether wireless power transmission will be performed in a first mode or a second mode in step S503.

In the first mode, the wireless power transmitter determines (selects) wireless power receivers to receive the wireless power from among the wireless power receivers, according to a predetermined charging method in step S504. An example of a predetermined charging method will be described in more detail in connection with FIG. 6.

In step S505, the wireless power transmitter transmits wireless power messages to the selected wireless power receivers, indicating that they have been selected to be charged, and transmits charging function control signals to turn on their charging functions so that they can be supplied with the wireless power. In step S506, the wireless power transmitter transmits to the other wireless power receivers, i.e., those not selected to receive the wireless power, charging function control signals to turn off their charging functions.

In the second mode, the wireless power transmitter checks power management information for respective priorities of the wireless power receivers, in step S507.

If the power management information received from a particular wireless power receiver has top priority information in step S508, the wireless power transmitter transmits charging function control signals that turn off the charging functions to the wireless power receivers other than the wireless power receiver with the top priority, in step S509. In step S510, the wireless power transmitter transmits a message to the top priority wireless power receiver that it is enabled to be charged and a charging function control signal to turn on its charging function, Thereafter, the wireless power transmitter supplies the wireless power receiver with the wireless power.

If the power management information received from the particular wireless power receiver does not include top priority information in step S508, the wireless power transmitter transmits a message indicating that the particular wireless power receiver will not be charged and a charging function control signal to turn off its charging function, in step S511.

However, if it is determined that the output capacity of the wireless power transmitter is greater than the total sum of power capacities of all of the wireless power receiver in step S502, the wireless power transmitter transmits messages to the wireless power transmitters, indicating that they are to be charged and charging function control signals to turn on their charging functions in step S512. Thereafter, the wireless power transmitter supplies all of the wireless power receivers with the wireless power.

As described above, a wireless power transmitter in accordance with an embodiment of the present invention may reasonably determine which of the wireless power receivers are to receive the wireless power more, in various ways, e.g., depending on a mode, such as the first mode or the second mode.

Figure 6:
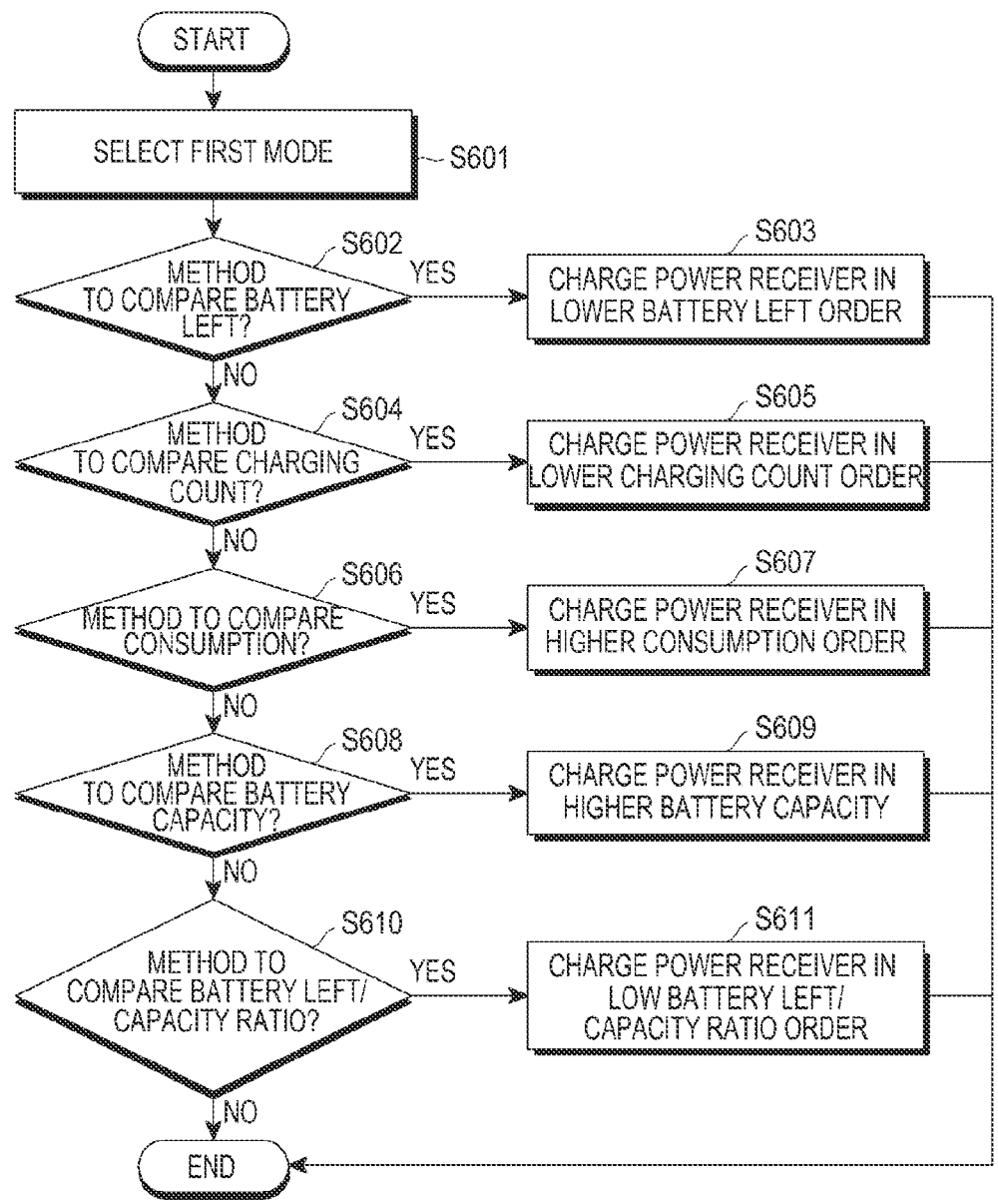
FIG. 6 is a flowchart illustrating various charging methods, according to an embodiment of the present invention.

FIG. 6 is a flowchart illustrating various charging methods for a wireless power transmitter operating in a first mode, according to an embodiment of the present invention.

Referring to FIG. 6, the wireless power transmitter selects the first mode in step S601. In steps S602 to S610, the wireless power transmitter determines whether a charging method of the wireless power transmitter that corresponds to the first mode is a method to compare remaining battery powers, a method to compare charging counts, a method to compare power consumptions, a method to compare battery capacities, or a method to compare remaining battery power/capacity ratios. For example, the charging method corresponding to the first mode may be set by a user.

If the charging method is to compare remaining battery powers, as in step S602, the wireless power transmitter determines wireless power receivers to receive the wireless power, based on the remaining battery powers of the wireless power receivers, e.g., the wireless power transmitter may select the receivers having the lowest remaining battery powers, in step S603.

More specifically, the wireless power transmitter analyzes remaining battery power information included in the received power management information and sorts the wireless power receivers from lowest remaining battery power to highest remaining battery power. Thereafter, the wireless power transmitter determines which of the wireless power receivers will receive the wireless power, based on the sorted order. That is, the wireless power transmitter selects, in order, as many of the wireless power receivers as possible, before the total sum of power capacities of the selected wireless power receivers exceeds the output capacity of the wireless power transmitter. Thereafter, the wireless power transmitter notifies the wireless power receivers of the charging decisions, as described above, and then supplies the wireless power to the selected receivers.

If the charging method is to compare charging counts, as in step S604, the wireless power transmitter determines which of the wireless power receivers will receive the wireless power, based on the charging counts of the receivers, e.g., the wireless power transmitter selects the wireless power receivers having the lowest charging counts, in step S605.

More specifically, the wireless power transmitter analyzes charging count information included in the power management information and sorts the wireless power receivers from the lowest charging count to the highest. Thereafter, the wireless power transmitter determines the wireless power receivers from the sorted order, based on the lower charging count order. That is, the wireless power transmitter selects, in order, as many of the wireless power receivers as possible, before the total sum of power capacities of the selected wireless power receivers exceeds the output capacity of the wireless power transmitter. Thereafter, the wireless power transmitter notifies the wireless power receivers of the charging decisions, as described above, and then supplies the wireless power to the selected receivers.

If the charging method is to compare consumptions, as in step S606, the wireless power transmitter determines which of the wireless power receivers will receive the wireless power, based on the consumptions of the wireless power receivers, e.g., the wireless power transmitter selects the wireless power receivers having higher consumptions, in step S607.

More specifically, the wireless power transmitter analyzes consumption information included in the power management information and sorts the wireless power receivers in order from a highest consumption to lowest. Thereafter, the wireless power transmitter determines which of the wireless power receivers will receive the wireless power, based on the higher consumption order. That is, the wireless power transmitter selects, in order, as many of the wireless power receivers as possible, before the total sum of power capacities of the selected wireless power receivers exceeds the output capacity of the wireless power transmitter. Thereafter, the wireless power transmitter notifies the wireless power receivers of the charging decisions, as described above, and then supplies the wireless power to the selected receivers.

If the charging method is to compare battery capacities, as in step S608, the wireless power transmitter determines which of the wireless power receivers will receive the wireless power, based on the battery capacities of the wireless power receivers, e.g., the wireless power transmitter selects the wireless power receivers having higher battery capacities, in step S609.

More specifically, the wireless power transmitter analyzes battery capacity information included in the power management information and sorts the wireless power receivers in order from highest battery capacity to lowest. Thereafter, the wireless power transmitter determines which of the wireless power receivers will receive the wireless power, based on the higher battery capacity order. That is, the wireless power transmitter selects, in order, as many of the wireless power receivers as possible, before the total sum of power capacities of the selected wireless power receivers exceeds the output capacity of the wireless power transmitter. Thereafter, the wireless power transmitter notifies the wireless power receivers of the charging decisions, as described above, and then supplies the wireless power to the selected receivers.

If the charging method is to compare remaining battery power/capacity ratios, as in step S610, the wireless power transmitter determines which of the wireless power receivers will receive the wireless power, based on the remaining battery power/capacity ratios of the wireless power receivers, e.g., the wireless power transmitter selects the wireless power receivers having lower remaining battery power/capacity ratios, in step S611.

More specifically, the wireless power transmitter analyzes remaining battery power/capacity ratio information included in the power management information and sorts the wireless power receivers in order from a lowest remaining battery power/capacity ratio to the highest. Thereafter, the wireless power transmitter determines which of the wireless power receivers will receive the wireless power, based on the lower remaining battery power/capacity ratio order. That is, the wireless power transmitter selects, in order, as many of the wireless power receivers as possible, before the total sum of power capacities of the selected wireless power receivers exceeds the output capacity of the wireless power transmitter. Thereafter, the wireless power transmitter notifies the wireless power receivers of the charging decisions, as described above, and then supplies the wireless power to the selected receivers.

According to the above-described embodiments of the present invention, a wireless power transmitter stably supplies wireless power to multiple wireless power receivers, even when a total sum of capacities of the multiple wireless power receivers exceeds an output capacity of the wireless power transmitter. Further, the wireless power transmitter may supply wireless power to multiple wireless power receivers, based on an order determined using various priorities.

Although certain embodiments of the present invention have been illustrated and described above, it will be understood that various modifications can be made without departing the scope of the present invention. Thus, it will be apparent to those ordinary skilled in the art that the present invention is not limited to the above-described embodiments, but is defined by the appended claims and their equivalents.

What is claimed is:

1. A wireless power transmitter for transmitting wireless power to at least one wireless power receiver, the wireless power transmitter comprising:
    a communication unit that receives power management information from each of the at least one wireless power receiver, wherein the power management information includes a power capacity of each of the at least one wireless power receiver; and
    a controller that:
        analyzes the power management information,
        identifies whether an output capacity of the wireless power transmitter is greater than a total sum of the power capacities of the at least one wireless power receiver,
        selects a charging priority identifying method for identifying a charging priority of the at least one wireless power receiver from a plurality of charging priority identifying method candidates, if the output capacity of the wireless power transmitter is less than or equal to the total sum of the power capacities of the at least one wireless power receiver,
        identifies the charging priority of each of the at least one wireless power receiver according to the selected charging priority identifying method, and
        identifies at least one wireless power receiver to be charged according to the charging priority of the at least one wireless power receiver.

2. The wireless power transmitter of claim 1, further comprising a wireless power transmission unit that transmits the wireless power for charging the at least one wireless power receiver.

3. The wireless power transmitter of claim 2, wherein the controller controls the wireless power transmission unit to supply power to all of the at least one wireless power receiver, if the output capacity of the wireless power transmitter is greater than the total sum of the power capacities of the at least one wireless power receiver.

4. The wireless power transmitter of claim 1, wherein the controller controls the wireless power transmission unit to transmit charging control signals to the selected at least one wireless power receiver to be charged, and
    wherein the charging control signals control the selected at least one wireless power receiver to be charged to prepare to be charged.

5. The wireless power transmitter of claim 1, wherein the controller controls the wireless power transmission unit to transmit charging control signals to a non-selected wireless power receiver, and
    wherein the charging control signals control the non-selected wireless power receiver to disable their charging functions.

6. The wireless power transmitter of claim 1, wherein the power management information further includes charging priority information of the wireless power receiver, and wherein the controller identifies a wireless power receiver having a top charging priority to be charged.

7. The wireless power transmitter of claim 6, wherein the controller controls the wireless power transmission unit to transmit wireless power charging control signals to the at least one wireless power receiver, other than the wireless power receiver having the top charging priority, and
wherein the charging control signals control the at least one wireless power receiver, other than the wireless power receiver having the top charging priority, to disable their charging functions.

8. The wireless power transmitter of claim 1, wherein the power management information further includes at least one of remaining battery power, charging count, consumption, battery capacity, and remaining battery power/capacity ratio, and
wherein the controller identifies the at least one wireless power receiver to be charged, based on the at least one of the remaining battery power, the charging count, the consumption, the battery capacity, and the remaining battery power/capacity ratio.

9. The wireless power transmitter of claim 8, wherein the controller further identifies the at least one wireless power receiver to be charged, based on a remaining battery power order, based on a lower charging count order, based on a higher consumption order, based on a higher battery capacity order, or based on a lower remaining battery power/capacity order.

10. A method for transmitting, by a wireless power transmitter, wireless power to at least one wireless power receiver, the method comprising:
receiving power management information from each of the at least one wireless power receiver, wherein the power management information includes a power capacity of each of the at least one wireless power receiver;
identifying whether an output capacity of the wireless power transmitter is greater than a total sum of the power capacities of the at least one wireless power receiver,
selecting a charging priority identifying method for identifying a charging priority of the at least one wireless power receiver from a plurality of charging priority identifying method candidates, if the output capacity of the wireless power transmitter is less than or equal to the total sum of the power capacities of the at least one wireless power receiver,
identifying the charging priority of each of the at least one wireless power receiver according to the selected charging priority identifying method, and
identifying at least one wireless power receiver to be charged according to the charging priority of the at least one wireless power receiver.

11. The method of claim 10, further comprising transmitting the wireless power for charging all of the at least one wireless power receiver, if the output capacity of the wireless power transmitter is greater than the total sum of the power capacities of the at least one wireless power receiver.

12. The method of claim 10, further comprising transmitting charging control signals to the selected at least one wireless power receiver to be charged,
wherein the charging control signals control the selected at least one wireless power receiver to be charged to prepare to be charged.

13. The method of claim 12, further comprising transmitting the wireless power for charging the selected at least one wireless power receiver to be charged.

14. The method of claim 10, further comprising transmitting charging control signals to a non-selected wireless power receiver,
wherein the charging control signals control the non-selected wireless power receiver to disable their charging functions.

15. The method of claim 10, wherein the power management information further includes charging priority information of the at least one wireless power receiver, and
wherein the method further comprises identifying a wireless power receiver having a top charging priority to be charged.

16. The method of claim 15, further comprising transmitting wireless power charging control signals to the at least one wireless power receiver, other than the wireless power receiver having the top charging priority,
wherein the charging control signals control the at least one wireless power receiver, other than the wireless power receiver having the top charging priority, to disable their charging functions.

17. The method of claim 10, wherein the power management information further includes at least one of remaining battery power, charging count, consumption, battery capacity, and remaining battery power/capacity ratio, and
wherein identifying the at least one wireless power receiver to be charged comprises identifying the at least one wireless power receiver to be charged based on the at least one of the remaining battery power, charging count, consumption, battery capacity, and remaining battery power/capacity ratio.

18. The method of claim 17, wherein identifying the at least one wireless power receiver to be charged further comprises identifying the at least one wireless power receiver to be charged based on a lower remaining battery power order, based on a lower charging count order, based on a higher consumption order, based on a higher battery capacity order, or based on a lower remaining battery power/capacity order.

* * * * *